Aug. 21, 1956   F. E. MADDEN   2,759,320
POWER LAWN MOWER

Filed Jan. 21, 1952   2 Sheets-Sheet 1

INVENTOR:
Frank E. Madden
BY
Milo B. Stevens & Co.
Attorneys.

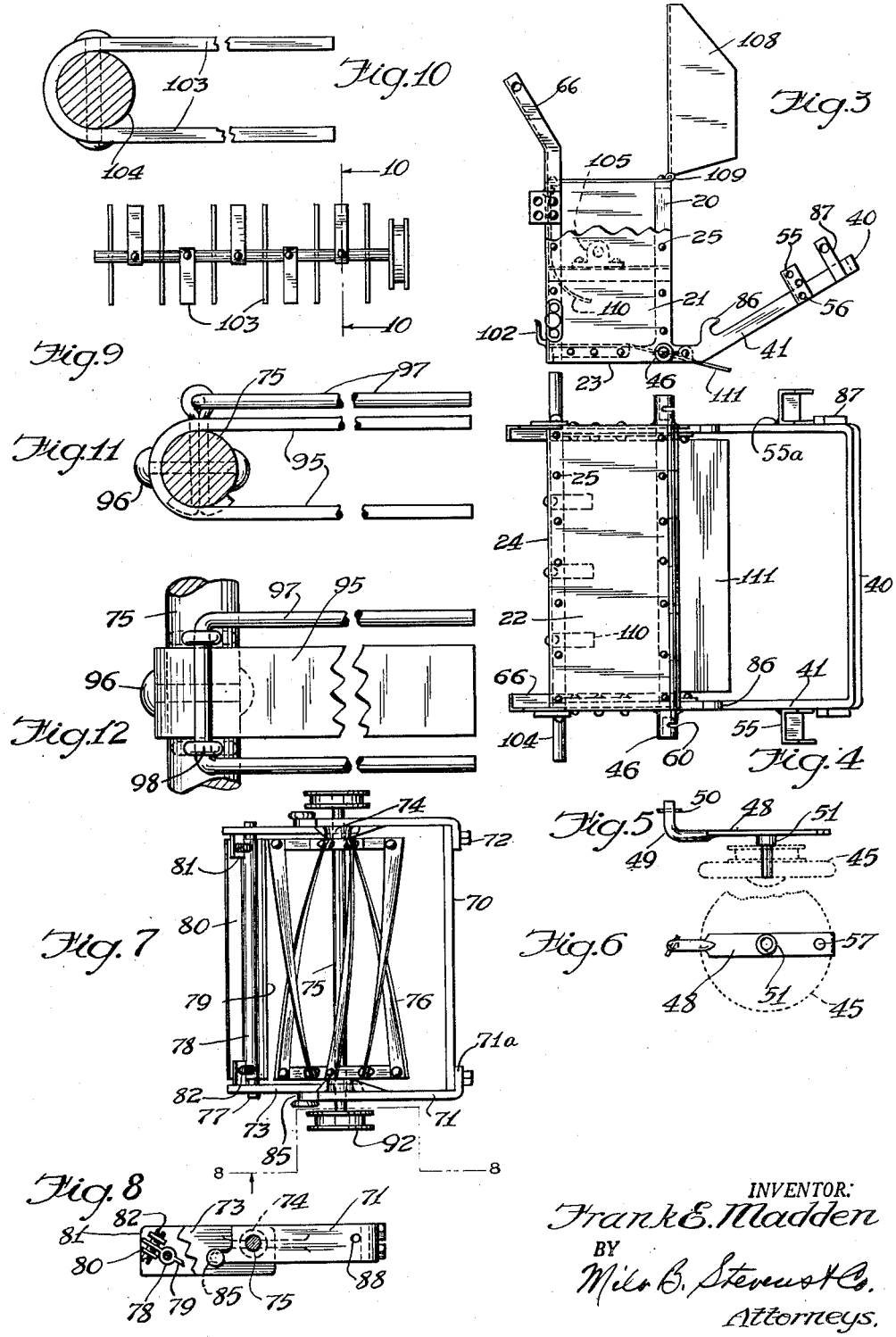

United States Patent Office 2,759,320
Patented Aug. 21, 1956

2,759,320

POWER LAWN MOWER

Frank E. Madden, Brookfield, Ill.

Application January 21, 1952, Serial No. 267,481

4 Claims. (Cl. 56—26)

My invention relates to lawn mowers which are power operated and one object is to provide a mower of this type with means to receive a grass cutting unit which is interchangeable with a grass sweeping unit, so that the same machine may be conveniently used for sweeping up the cut grass and leaves after the lawn has been mowed.

A further object is to provide a machine of the above character which incorporates a receptacle for the cut grass and leaves and a transfer unit designed to supplement the action of the grass sweeping unit by depositing the cut grass and leaves in the receptacle.

Another object is to design the novel machine in a manner to dispose the interchangeable units and the drive means for the same independently of the running gear of the machine and readily accessible for changing the units or making any adjustment or repair therein.

An additional object is to construct the machine with a novel inclined frontal frame member which facilitates access by the cutting units to taller grass and weed stalks.

A still further object is to build the machine with an upright box-like frame which not only facilitates the compact assembling of the power plant, running gear and transfer unit, but also combines lightness and rigidity in the construction of the machine.

Another object is to equip the machine with a front wheel assembly which is adjustable to several heights for adapting the machine to different growths of grass.

With the above objects in view, and any others which may suggest themselves from the description to follow, a better understanding of the invention may be had by reference to the accompanying drawings, in which—

Fig. 3 is a side elevation of the frame;

Fig. 4 is a top plan view of the latter;

Fig. 5 is a top plan view of a front wheel carrier;

Fig. 6 is an elevation of the latter;

Fig. 7 is a top plan view of the grass cutting unit;

Fig. 8 is a section taken on the line 8—8 of Fig. 7 showing the frame of the grass cutting unit, the left-hand portion of the view being broken away;

Fig. 9 is a view of the transfer unit as taken on the line 9—9 of Fig. 1;

Fig. 10 is a magnified section taken on the line 10—10 of Fig. 9;

Fig. 11 is a magnified section of the grass sweeping unit as taken on the line 11—11 of Fig. 2; and Fig. 12 is a magnified top plan view of one element of the grass sweeping unit as seen in Fig. 2 or Fig. 11, with intermediate parts broken away.

Figure 1:
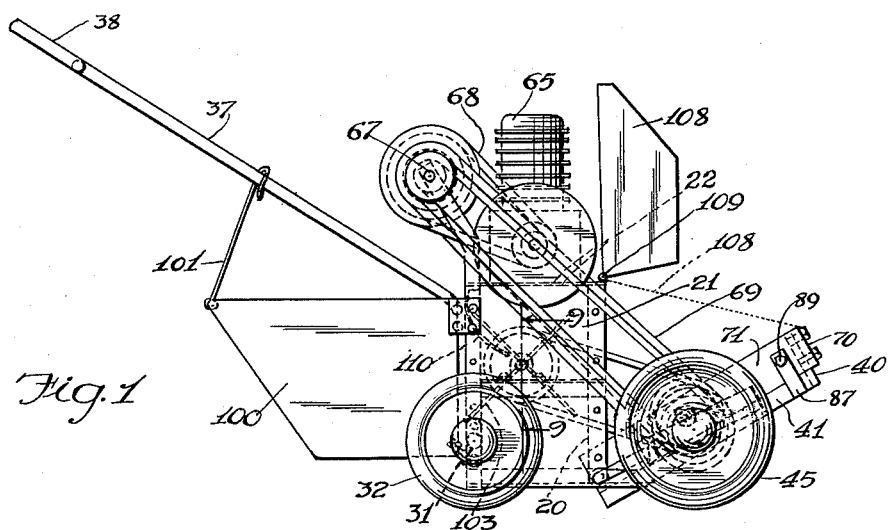
Fig. 1 is a side elevation of the machine.

Referring specifically to the drawings, the box-type frame of the machine is built of angle bars 20, these being covered by side walls 21, a top 22, a bottom 23 and a back wall 24, all made of sheet metal and bolted to the frame bars at 25 or otherwise secured thereto.

The frame 20 carries a bottom shaft 31 at the rear on which a pair of back wheels 32 are mounted; and the frame also has the rear end extensions 35 for the support of a crossbar 36 extended rearwardly with push rods 37 and a handle 38 for the same.

Figure 2:
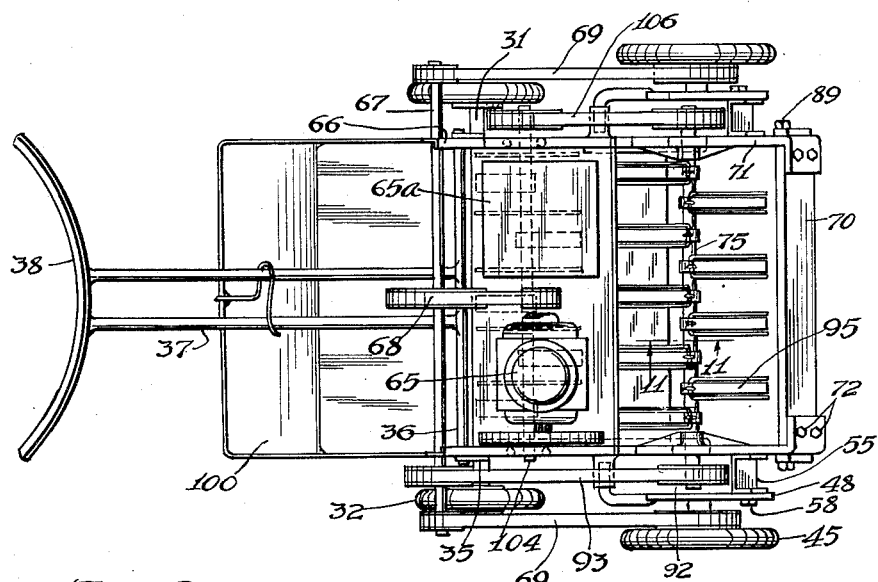
Fig. 2 is a top plan view.

The bottom of the frame 20 is extended forwardly with a rising frame member 40 having side bars 41; and means are provided for the frame 20 and the frame member 40 to adjustably dispose the front wheels 45 of the machine. Thus, the frame 20 is extended sidewise with a pair of short tubes 46. The bracket 48 for each front wheel—as seen in Figs. 5 and 6—is formed with a sturdy inward bend 49 which is insertible into the related tube 46 as indicated by dotted lines in the top and bottom center of Fig. 4; and each bend 49 carries a cotter pin 50 passing through the tube as a retainer for the bracket. The latter has an outward axle 51 suitably designed to receive the wheel 45. The front end portion of each bracket 48 occurs alongside a channel lug 55 welded at 55a to the correspondingly located frontal side bar 41; and the outer wall of the lug is drilled with a series of tapped holes 56 on an arc centered on the wheel bracket bend 49. The front end portion of the bracket has a hole 57 designed to register with any one of the holes 56 according to the height at which the front wheels are designed to be positioned, bolts 58 directed through the holes 57 into the proper holes 56—as seen in Fig. 2— serving to secure the front wheels as desired. The angular adjustment of the wheel brackets 48 necessitates the cutting of clearance slots 60 in the frontal portions of the tubes for the cotter pins 50, as shown in the top and bottom center of Fig. 4. It is now apparent that the construction of the frame 20 renders it underslung in respect to the wheels, lending the vehicle balance and stability; and the rising frame member 40—41 is designed to climb over and clear such weeds or stalks as it intercepts.

The frame 20 is surmounted by a power plant—such as an engine 65 and fuel tank 65a—and has rearward bends 66 from its rear upright bars for journaling a cross-shaft 67 which receives a belt drive 68 near the center from the power plant 65; and the front wheels 45 receive belt drives 69 from the end portions of the cross-shaft 67, such drives being directed laterally by inclination and therefore not materially affected by the vertical adjustment of the wheels.

The space in the frontal frame member 40 is devoted to the placement of the grass cutting unit shown in Fig. 7 or the grass sweeping unit shown installed in Fig. 2. The frames of these units are of sturdy flat stock and identical in nature. Thus, Fig. 8 shows the unit frame to have a frontal cross-bar 70, side bars 71 with frontal bends 71a overlapping the ends of the cross-bar 70 and bolted to the latter at 72, and inner bars 73 extended rearwardly from the side bars 71. These are formed with web-reinforced bearings 74 on the inside for journaling the shaft 75 of a typical grass cutter 76, while the extension bars 73 serve as keepers for a cross-shaft 77 on which a sleeve 78 presenting the usual stationary blade 79 for the grass cutter is journaled. The extension bars also carry upper and lower lugs 80 between which wings 81 from the sleeve 78 enter, set screws 82 being directed through the lugs to the wings for the angular adjustment of the stationary blade 79 in conformity with conventional practice.

The frontal and side bars 70 and 71 of the unit frame are dimensioned to seat on the frontal frame member 40—41 of the machine when the chosen unit is deposited thereon. In this event rounded tongues 85 projecting rearwardly from the side bars 71—see Figs. 7 and 8— seat in hook-like receptacles 86 rising from the side bars 41—see Fig. 3—securing the back of the unit frame to the frontal machine frame member 40. Guide lugs 87 rise from the side bars 71 as shown in Fig. 1, the latter having tapped holes 88 into which bolts 89 driven through the lugs 87 are screwed to secure the frontal portion of the unit frame to the machine frame member 40.

Both unit frames journal the shaft 75, the side bars 71 and bosses 74 extending inwardly from the same being perforated to form bearings for the shaft. The latter extends from the sides of the frame to receive pulleys 92; and the lower part of Fig. 2 shows that one of these pulleys is connected to the cross-shaft 67 by a belt drive 93. The unit of Fig. 7 may thus be considered as driven by the power plant when the machine is in process of mowing a lawn. When this operation has been completed the grass cutting unit is removed by reversing the installing operation and the grass sweeping unit mounted. As shown in Figs. 2 and 12, the shaft 75 of this unit extends with an array of staggered U-shaped beater blades 95 riveted at 96 to the shaft; and double-pronged agitators 97 are freely pivoted at 98 to the shaft in the region of each beater blade. Thus, while the cut grass and leaves are stirred up by the agitators 97 the blades 95 beat the cut grass and leaves back into the bottom of the machine frame 20.

Figs. 1 and 2 show a receptacle 100 attached in communication with the back of the machine frame 20, suitable hook means 101 and 102 (see Fig. 3) being provided for this purpose. This receptacle is intended to receive the cut grass and leaves accumulating in the machine frame 20, and a transfer unit is provided to facilitate this process. Thus, Figs. 1, 2 and 9 show a rotary beating and agitating element 103 similar to that employed for the grass sweeping unit, the unit 103 being carried by a shaft 104. The latter is journaled in bearings 105 mounted approximately in the center of the frame 20; and the upper part of Fig. 2 shows that the shaft 104 receives a belt drive 106 from the unit shaft 75, causing the transfer unit to be driven by the grass sweeping unit and in the same direction.

Since the agitation of the grass, weeds and stalks in the front of the machine may tend to scatter loose material in an upward direction, the top of the frame 20 receives a hood 108 pivoted at 109 to swing down from the full line position of Fig. 1 to the finely-dotted one therein. Similarly, a few baffles 110 are secured in the frame 20 before the entrance to the receptacle 100 to form back stops for material rising in the same. Finally, an inclined pan 111 leads into the bottom of the frame 20 from the front as a threshhold to catch material thrown back by the unit operating in the frontal frame zone.

It will now be apparent that the novel machine has a number of advantageous features. Thus, the interchangeable units make it feasible to use the same machine for both the mowing and sweeping functions, and to do so efficiently with only a brief amount of labor to make the change for either function. Further, the machine is built to receive either unit independently and clear of the drive wheels and the power connections to the same. Further, the units fit in an inclined frontal carrier which facilitates the engagement of taller grass, weeds and stalks without clogging the mower. Further, a simple front wheel adjustment is provided as an added measure for the purpose just stated. Further, the cutting or sweeping unit is not behind the front wheels, but even with the same, so that it may move up to a wall, fence or other limit of the area covered. Further, the frame of the machine is of skeleton construction to make for both lightness and a chamber for the essential parts. Further, an arrangement of power drives is provided which is properly balanced, fully accessible and without the possibility of one drive interfering with another. Further, a transfer mechanism for cut grass and leaves is provided in a central position between the grass cutting unit in front and the disposal receptacle in the rear. Further, the parts of the machine are grouped compactly, whereby to limit the machine to a size which can be handled and maneuvered conveniently. Finally, the machine employs a minimum number of parts consistent with its structural and functional requirements, facilitating its production at reasonable cost.

While I have described the invention along specific lines, various minor changes or refinements may be made therein without departing from its principle, and I reserve the right to employ all such changes and refinements as may come within the scope and spirit of the appended claims.

I claim:

1. A lawn mowing machine comprising a frame having rear ground wheels centered at a height above the bottom of the frame, a forwardly extending and rising member projected from the frame, means journaling a pair of frontal ground wheels from a point intermediate the rear and forward portions of said member, a grass cutting unit mounted in said member, and power means to operate said unit, said grass cutting unit having a frame similar in form to said member and designed to be superimposed on the latter, such member having hook-shaped receptacles at its lower end and side lugs near its upper end, the unit frame having tongues in its rear portion designed to fit said receptacles when the unit frame is assembled with the member, and bolts applied by way of said side lugs to secure the frontal part of the unit frame to that of the member.

2. A lawn mowing machine comprising a frame having rear ground wheels centered at a height above the bottom of the frame, a forwardly extending and rising member projected from the frame, means journaling a pair of frontal ground wheels from a point intermediate the rear and forward portions of said member, a grass cutting unit mounted in said member, and power means to operate said unit, supports for said frontal wheels comprising side brackets pivoted at their rear ends to said frame and journaling said wheels, lugs projecting sidewise from said member and presenting vertical walls along the inner sides of said brackets, such walls having arcuate rows of perforations centered on the bracket pivots, and bolts carried by the brackets for connection with the lugs by way of selected ones of said perforations whereby to vary the height of the frontal wheels accordingly.

3. A lawn mowing machine comprising a frame having rear ground wheels centered at a height above the bottom of the frame, a forwardly extending and rising member projected from the frame, means journaling a pair of frontal ground wheels from a point intermediate the rear and forward portions of said member, a grass cutting unit mounted in said member, power means to operate said unit, said member composed of side bars connected by a frontal cross-bar, said grass cutting unit having a frame with bars arranged to match those of said member and designed to be superimposed on the same when the grass cutting unit is mounted as stated, and means for attaching the unit frame to the member.

4. A lawn mowing machine comprising a frame having rear ground wheels centered at a height above the bottom of the frame, a forwardly extending and rising member projected from the frame, means journaling a pair of frontal ground wheels from a point intermediate the rear and forward portions of said member, a grass cutting unit mounted in said member, power means to operate said unit, the frontal ground wheels being outside said member, and said unit being within the same and substantially in line with said frontal ground wheels.

References Cited in the file of this patent

UNITED STATES PATENTS

| Number | Name | Date |
|---|---|---|
| 977,092 | Hedges | Nov. 29, 1910 |
| 1,138,730 | Coldwell | May 11, 1915 |
| 1,173,485 | Coldwell | Feb. 29, 1916 |
| 2,283,161 | Booten | May 19, 1942 |
| 2,368,290 | Donald | Jan. 30, 1945 |
| 2,505,576 | Reitan | Apr. 25, 1950 |
| 2,525,090 | Bott | Oct. 10, 1950 |
| 2,546,265 | Kelsey | Mar. 27, 1951 |
| 2,572,109 | Coates | Oct. 23, 1951 |
| 2,603,932 | Tom | July 22, 1952 |